US009323023B2

(12) United States Patent
Hsu et al.

(10) Patent No.: US 9,323,023 B2
(45) Date of Patent: Apr. 26, 2016

(54) LENS FOCUSING DEVICE

(75) Inventors: Shang-Yu Hsu, Yangmei Taoyuan (TW);
Kun-Shih Lin, Yangmei Taoyuan (TW);
Fu-Yuan Wu, Yangmei Taoyuan (TW)

(73) Assignee: TDK TAIWAN CORPORATION,
Taipei (TW)

( * ) Notice: Subject to any disclaimer, the term of this patent is extended or adjusted under 35 U.S.C. 154(b) by 37 days.

(21) Appl. No.: 13/588,701

(22) Filed: Aug. 17, 2012

(65) Prior Publication Data

US 2014/0049848 A1     Feb. 20, 2014

(51) Int. Cl.
| | |
|---|---|
| *G02B 7/02* | (2006.01) |
| *G02B 7/10* | (2006.01) |
| *G02B 7/04* | (2006.01) |
| *G02B 7/08* | (2006.01) |

(52) U.S. Cl.
CPC ........ *G02B 7/10* (2013.01); *G02B 7/023* (2013.01); *G02B 7/04* (2013.01); *G02B 7/08* (2013.01)

(58) Field of Classification Search
CPC .......... G02B 7/102; G02B 7/022; G02B 7/08; G02B 15/14; G02B 7/04; G02B 13/001; G02B 7/023; G02B 27/646; G02B 7/10; G02B 7/282
USPC .......................... 359/819–824, 811–813, 814
See application file for complete search history.

(56) References Cited

U.S. PATENT DOCUMENTS

| | | | | |
|---|---|---|---|---|
| 7,649,703 | B2* | 1/2010 | Shiraki ............. | H02K 41/0346 310/14 |
| 7,864,461 | B2* | 1/2011 | Yoshioka ............. | G02B 7/08 310/12.16 |
| 7,880,983 | B2* | 2/2011 | Hagiwara ................ | 359/819 |
| 2008/0247063 | A1* | 10/2008 | Otsuki et al. ............. | 359/824 |
| 2011/0141564 | A1* | 6/2011 | Sata ............ | G02B 7/102 359/557 |
| 2011/0310500 | A1* | 12/2011 | Osaka et al. ............. | 359/824 |
| 2012/0008221 | A1* | 1/2012 | Min et al. ............. | 359/824 |
| 2012/0057252 | A1* | 3/2012 | Ishiguro .......... | H02K 41/0356 359/824 |
| 2012/0300322 | A1* | 11/2012 | Takashima .............. | 359/824 |

* cited by examiner

*Primary Examiner* — Ricky Mack
*Assistant Examiner* — Daniele Manikeu
(74) *Attorney, Agent, or Firm* — Muncy, Geissler, Olds & Lowe, P.C.

(57) ABSTRACT

A lens focusing device includes a lens holder, a winding fitted around the lens holder, and an outer case enclosing the lens holder therein. The outer case includes an outer wall portion, and multiple inner wall portions connected to the outer wall portion via multiple connecting portions. The inner wall portions are located between the lens holder and the winding, and respectively include an inner surface, an outer surface, and a first and a second side surface. The lens holder is formed on an outer face with confining areas, each of which includes a main surface and a first and a second raised side surface respectively facing against the inner surface and the first and second side surfaces, so that the inner wall portions are limited to move relative to the lens holder only within the confining areas. Therefore, the lens focusing device is impact-resistant and undue-twisting protected.

6 Claims, 6 Drawing Sheets

LENS FOCUSING DEVICE

FIELD OF THE INVENTION

The present invention relates to a lens focusing device, and more particularly to a lens focusing module that can be used with a cell phone or a camera for shooting pictures.

BACKGROUND OF THE INVENTION

Generally, a lens focusing device can be used with a variety of handheld devices, such as cell phones, cameras, tablet computers, notebook computers and the like, as well as with various types of webcams, to serve as a lens auto-focusing means during picture shooting.

Up to date, there are many technical means for modifying or improving the shape of a lens holder or an outer case of the lens focusing device, such as lens holder structure and outer case structure designed to enable easier assembling of a lens to the lens holder, or a modification to the octagonal winding structure and the outer case to ensure a wider space for lens assembling.

However, all the currently available lens focusing devices use spring members to maintain the lens holder in an elastically movable state. When a conventional lens focusing device is subjected to the impact of an external force on it, the lens holder elastically movably connected to the spring members tends to collide with other components located therearound and becomes damaged.

Moreover, the lens is generally held in the lens holder by screwing it into the lens holder. Since the lens holder is supported only by two spring members connected to an upper and a lower end thereof to maintain in the movable state, the spring members are possibly damaged when the lens is screwed into the lens holder with an undue turning force and the lens holder is excessively twisted.

In view of the above-mentioned drawbacks, it is desirable to develop a lens focusing device that is impact-resistant and undue-twisting protected.

SUMMARY OF THE INVENTION

A primary object of the present invention is to provide an impact-resistant and undue-twisting protected lens focusing device to overcome the drawbacks in the conventional lens focusing devices.

To achieve the above and other objects, the lens focusing device according to a preferred embodiment of the present invention includes a lens holder for holding a lens therein, a winding fitted around an outer face of the lens holder, and an outer case enclosing the lens holder therein. The outer case includes an outer wall portion, a plurality of inner wall portions, and a plurality of connecting portions. The inner wall portions are located between the lens holder and the winding, and the connecting portions are connected to between the outer wall portion and the inner wall portions.

The inner wall portions respectively include an inner surface facing toward the outer face of the lens holder, an outer surface facing toward the winding, and a first and a second side surface connected to between the inner and the outer surface.

The lens holder is formed on the outer face with a plurality of alternating confining areas and winding mounting portions. Each of the confining areas includes a main surface and a first and a second raised side surface. Each main surface is faced against the inner surface of one inner wall portion and located between two adjacent winding mounting portions. Each first raised side surface is located at one lateral edge of the main surface to face against the first side surface of the inner wall portion. Each second raised side surface is located at an opposite lateral edge of the main surface to face against the second side surface of the inner wall portion. Therefore, the confining areas serve to limit the spaces within which the inner wall portions can move.

When the lens focusing device is subjected to an impact of external force on it, the confining areas on the outer face of the lens holder would get into contact with the inner wall portions of the outer case and be restricted from moving further, and the inner wall portions would absorb the external force applied to the lens focusing device to effectively suppress any vibration of the lens holder caused by the impact of the external force on it, so that the lens focusing device is protected against damage. Moreover, when a lens is screwed into the lens holder to cause any undue twisting of the lens holder, the contact of the confining areas of the lens holder with the inner wall portions also functions to prevent the lens holder from being overly twisted. Therefore, the lens focusing lens according to the present invention can protect the lens holder against biasing or undue twisting caused by an external force applied thereto. As a result, the lens holder is prevented from deformation and the spring members connected to the lens holder are protected against damage.

In the present invention, the inner surfaces of the inner wall portions and the main surfaces of the confining areas all are flat surfaces, enabling precise control of a clearance between the inner wall portions and the lens holder as well as a clearance between the inner wall portions and the winding to ensure good driving of the lens holder by the voice coil motor. Further, since the above-mentioned clearances can be well controlled, it is able to advantageously achieve the purpose of minimization of the lens focusing device.

In the present invention, the first and the second raised side surface of each confining area are correspondingly faced against the first and the second side surface of each inner wall portion. The first and second raised side surfaces of the confining areas form effective restrictions to the movement of the lens holder relative to the first and second side surfaces of the inner wall portions, giving the lens focusing device even better impact resistance to effectively protect the lens holder against deformation or undue twisting caused by external force.

In the present invention, the connecting portions and the inner wall portions of the outer case are provided in pairs and in even number, and the confining areas provided on the outer face of the lens holder are also in even number corresponding to the inner wall portions. In this manner, the inner wall portions can be symmetrically arranged to balance the movement of the lens holder, and the contact of the confining areas with the inner wall portions allows the inner wall portions to more effectively absorb the impact of any external force on the lens focusing device and prevent undue twisting of the lens holder.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
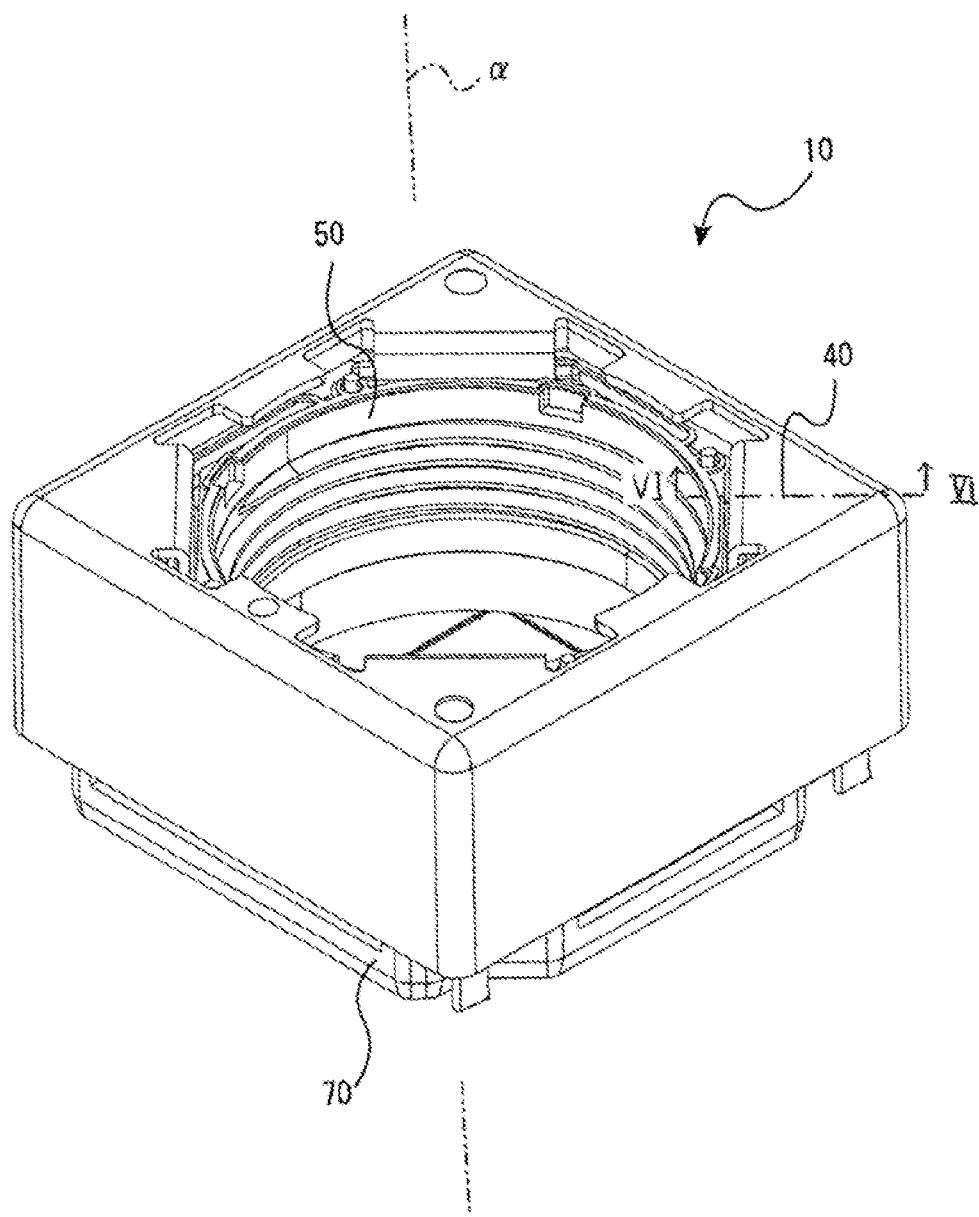
FIG. 1 is an assembled perspective view of a lens focusing device according to a preferred embodiment of the present invention.
Figure 2:
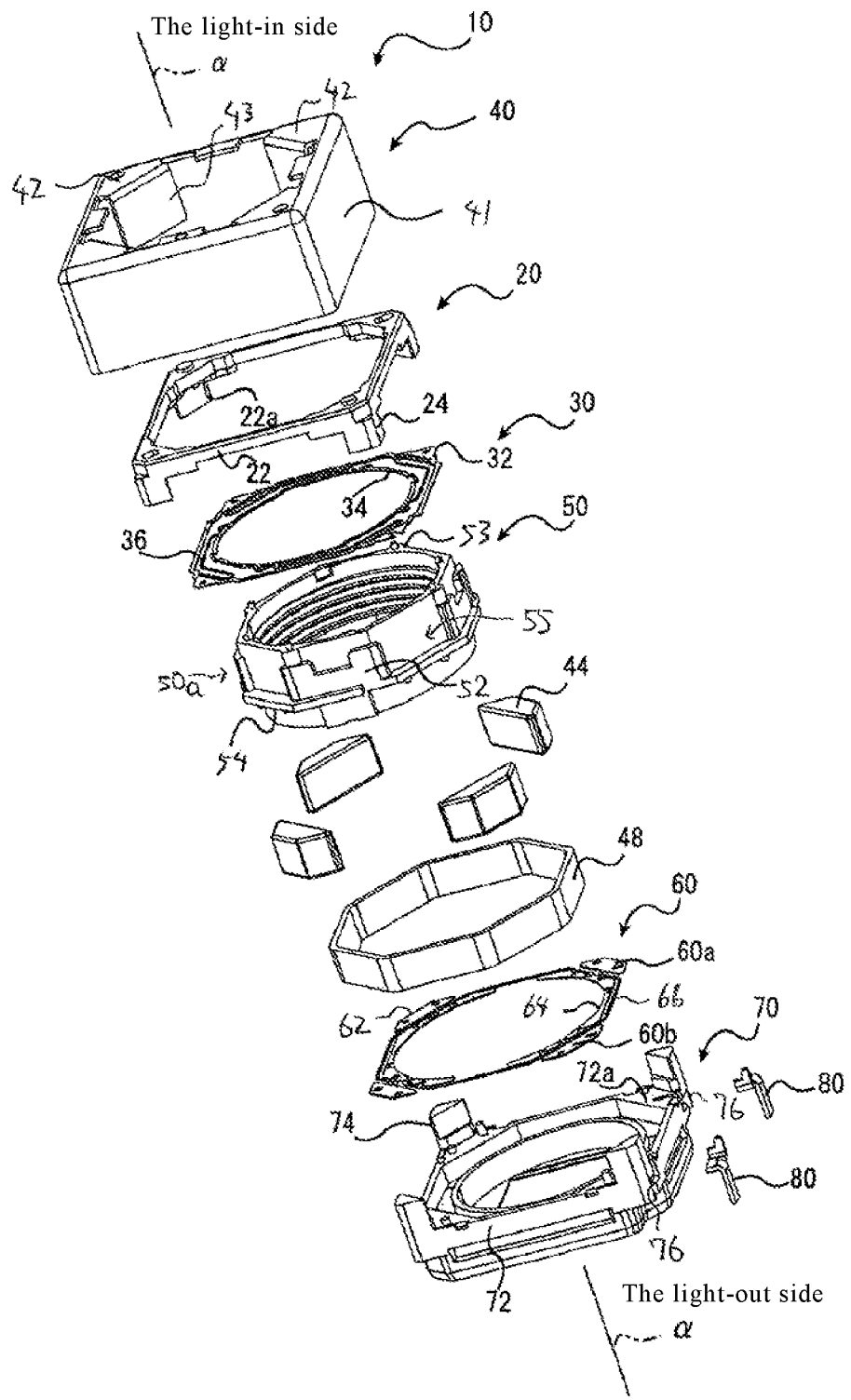
FIG. 2 is an exploded view of FIG. 1.

Please refer to FIG. 1 that is an assembled perspective view of a lens focusing device 10 according to a preferred embodiment of the present invention. As shown, the lens focusing device 10 has a substantially rectangular appearance; and mainly includes a lens holder 50 in the form of a hollow cylinder for holding a lens therein (not shown), an outer case 40 enclosing the lens holder 50 therein, and a base 70 serving as a bottom. FIG. 2 is an exploded view of FIG. 1. As can be seen from FIG. 2, the lens focusing device 10 further includes a top cover 20. The top cover 20 and the base 70 together hold the lens holder 50 in a movable state for focusing purpose. The lens focusing device 10 is internally provided with a voice coil motor, which drives the lens holder 50 to move along a direction of a light axis α relative to the base 70 for focusing purpose. Herein, when viewing along the light axis α, one side of the lens focusing device 10, from where light enters the lens, is referred to as a light-in side; and an opposite side of the lens focusing device 10, from where the light leaves the lens, is referred to as a light-out side. The lens focusing device 10 with an image sensor (not shown) arranged on the light axis α at the light-out side thereof can serve as a camera module having a focusing mechanism. However, the lens focusing device 10 of the present invention can be used in a wide range of other applications without being limited to the above purpose.

As can be seen from FIG. 2, the lens focusing device 10 further includes an upper spring member 30 located between the top cover 20 and the lens holder 50; a plurality of magnets 44 and a winding 48 located at an outer side of the lens holder 50; a lower spring member 60 located between the lens holder 50 and the base 70; and a plurality of connecting terminals 80.

The outer case 40 is made of a soft magnetic material, such as iron. The magnetic flux of the magnets 44 passes through the conductive material of the winding 48. In the illustrated embodiment of the lens focusing device 10, the outer case 40 encloses the top cover 20 and the base 70. The outer case 40 includes an outer wall portion 41, a plurality of inner wall portions 43 located between the outer wall portion 41 and the lens holder 50, and a plurality of connecting portions 42 connected to between the outer wall portion 41 and the inner wall portions 43. In the present invention, the outer case 40 is not restricted to any particular shape, so long as it can enclose the top cover 20 and the base 70 therein.

The upper spring member 30 is connected to the top cover 20 and supports a light-in side of the lens holder 50. The top cover 20 includes a top cover frame portion 22 and a plurality of top cover post portions 24 located on a light-out side of the top cover frame portion 22 to extend along the direction of the light axis α toward the light-out side thereof. The light-out side of the top cover frame portion 22 is defined as an upper-spring-member mounting face 22a, on which an adhesive can be applied to bond to an outer ring portion 32 of the upper spring member 30. The top cover post portions 24 of the top cover 20 can also be correspondingly connected to a plurality of base post portions 74 of the base 70 using an adhesive. The top cover post portions 24 are in a number the same as that of the base post portions 74. However, the top cover post portions 24 are not necessarily in a number of four and are not necessarily located at four corner of the top cover 20 as shown in the illustrated preferred embodiment.

As can be seen in FIG. 2, the upper spring member 30 is elastically connected to between the top cover 20 and the lens holder 50, and the lens holder 50 is elastically supported on an extending direction of the light axis α by the upper spring member 30, which is connected to the top cover 20, and the lower spring member 60, which is connected to the base 70, such that the lens holder 50 is freely movable along the direction of the light axis α for focusing.

The upper spring member 30 is a multi-ring member including an outer ring portion 32, an inner ring portion 34, and an arm portion 36. The outer ring portion 32 is located at an outmost position of the upper spring member 30, and is connected to the upper-spring-member mounting face 22a of the top cover frame portion 22. The inner ring portion 34 is located at an inner side of the outer ring portion 32, and is connected to a light-in side inner-ring mounting face 53 on the light-in side of the lens holder 50 using an adhesive. The outer ring portion 32 and the inner ring portion 34 are elastically connected to each other by the arm portion 36.

The upper spring member 30 is made of an elastic metal material, so that the arm portion 36 is elastically deformable. Being elastically connected to the outer ring portion 32 by the elastically deformable arm portion 36, the inner ring portion 34 is movable along the direction of the light axis α toward the light-in side or the light-out side.

The magnets 44 are clamped by between the top cover frame portion 22 of the top cover 20 and a base frame portion 72 of the base 70 to locate around an outer side of the winding 48. In the illustrated preferred embodiment, the magnets 44 are located adjacent to an inner side of the top cover post portions 24 and the base post portions 74, and are arranged at four corners of the lens focusing device 10. However, the magnets 44 can be in any number without being limited to the quantity and the position shown in the illustrated embodiment.

Figure 6:
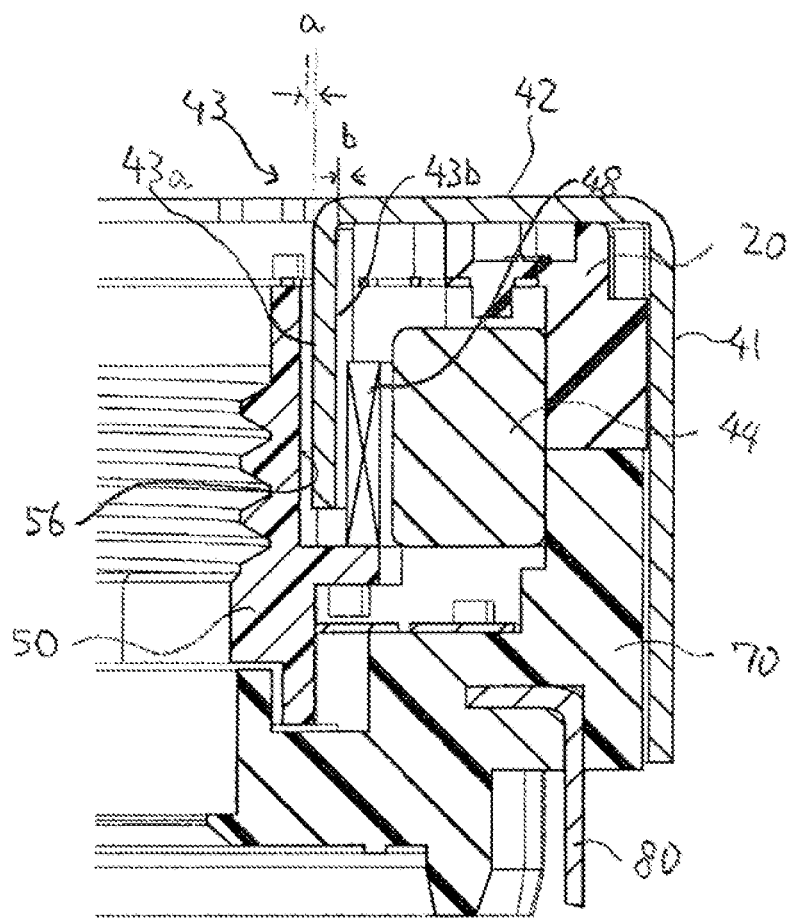
FIG. 6 is a sectional view taken along line VI-VI of FIG. 1.

When the lens focusing device 10 is in a fully assembled state, the winding 48 is located around an outer face 50a of the lens holder 50 and fitted to winding mounting portions 52 raised from the outer face 50a; and the magnets 44 are located around the outer side of the lens holder to inward face the winding 48, as can be seen in FIG. 6. In the illustrated embodiment, the magnets 44, the outer case 40 and the winding 48 together constitute the voice coil motor for driving the lens holder 50 to move.

The lower spring member 60 includes at least two parts 60a, 60b that are separated and electrically insulated from one another. Each of the separated parts 60a, 60b includes an outer ring portion 62, an inner ring portion 64, and an arm portion 66 elastically connected to between the outer ring portion 62 and the inner ring portion 64. The winding 48 has two ends electrically connected to the at least two separated and electrically insulated inner ring portions 64 of the lower spring member 60, allowing electric current to flow from the lower spring member 60 to the winding 48. As can be seen from FIG. 2, the at least two separated inner ring portions 64 of the lower spring member 60 are electrically connected to the connecting terminals 80, so that electric current can flow from the connecting terminals 80 to the lower spring member

60. That is, in the embodiment illustrated in FIG. 2, the winding 48 is electrically connected to the lower spring member 60, and the latter is further electrically connected to the connecting terminals 80, so that the connecting terminals 80 supply the winding 48 with electric power for driving the lens holder 50 to move.

As having been mentioned above, the light-in side of the lens holder 50 provides a light-in side inner-ring mounting face 53, to which the inner ring portion 34 of the upper spring member 30 is connected. The lens holder 50 also provides on its light-out side with a light-out side inner-ring mounting face 54, to which the inner ring portions 64 of the lower spring member 60 are connected.

As can be seen in FIG. 2, the lower spring member 60 is elastically connected to between the lens holder 50 and the base 70, and the at least two separated parts 60a, 60b of the lower spring member 60 respectively form part of the power supply path to the winding 48. Except for having two separated parts 60a, 60b, the lower spring member 60 is generally structurally similar to the upper spring member 30 and is a multi-ring member consisting of outer ring portions 62, inner ring portions 64 and arm portions 66.

The outer ring portions 62 of the lower spring member 60 are connected to a lower-spring-member mounting face 72a provided on a light-in side of the base frame portion 72. The inner ring portions 64 of the lower spring member 60 are located at an inner side of the outer ring portions 62, and are connected to the light-out side inner-ring mounting face 54 of the lens holder 50 using an adhesive.

Like the upper spring member 30, the lower spring member 60 is also made of an elastic metal material, so that the arm portions 66 are elastically deformable. Being elastically connected to the outer ring portions 62 via the elastically deformable arm portions 66, the inner ring portions 64 are movable relative to the outer ring portion 62 along the direction of the light axis α. Therefore, being supported by the lower spring member 60 connected to the base 70 and the upper spring member 30 connected to the top cover 20, the lens holder 50 is movable along the direction of the light axis α toward the light-in side or the light-out side for focusing.

In the illustrated preferred embodiment, the base 70 has a central opening. The base frame portion 72 is rectangular in shape to form a peripheral wall of the base 70. The base post portions 74 are located at four corners of the base frame portion 72 to extend toward the light-in side. In practical implementation of the present invention, the base 70 can be in other shape without being limited to the rectangular shape shown in FIG. 2, and the base post portions 74 can be in a number and at positions corresponding to those of the top cover 20 post portions 24 without being limited to the number and positions shown in FIG. 2.

The base frame portion 72 is provided on at least one side thereof with receiving grooves 76 for receiving the terminals 80 therein.

The connecting terminals 80 are used as power supply terminals for supplying external electrical power to the voice coil motor of the lens focusing device 10. More specifically, the connecting terminals 80 are electrically connected at their respective one end to the outer ring portions 62 of the lower spring member 60, and at another end to an external circuit board (not shown).

FIGS. 3 to 6 describe in details the structural relation between the outer case 40 and the lens holder 50. Please first refer to FIG. 3 that is an exploded perspective view showing the outer case 40 and the lens holder 50 in a disassembled state. As shown, the outer wall portion 41 of the outer case 40 is extended along the direction of the light axis α and in the shape of a hollow rectangular frame, the connecting portions 42 are arranged at four corners of a light-in side of the outer wall portion 41 to extend toward the light axis α at the center of the outer case 40, and the inner wall portions 43 are separately located at an end of the connecting portions 42 opposite to the outer wall portion 41. However, in the present invention, the outer case 40 is not necessarily limited to the rectangular shape; and the number of the connecting portions 42 is not necessarily limited to that shown in FIG. 3, so long as they are corresponding to the inner wall portions 43 in number and position.

The inner wall portions 43 of the outer case 40 are extended from the connecting portions 42 toward the light-out side, and are closer to the central light axis α than the outer wall portion 41. As can be seen in FIG. 6, the winding 48 and the magnets are located between the inner wall portions 43 and the outer wall portion 41. In the illustrated preferred embodiment, the inner wall portions 43 are respectively a substantially rectangular flat plate but not necessarily limited to this shape.

The inner wall portions 43 respectively have an inner surface 43a facing toward the central light axis α, an outer surface 43b facing toward the outer wall portion 41, and a first and a second side surface 43c, 43d connecting to between the inner surface 43a and the outer surface 43b.

As can be seen in FIG. 6, the inner surfaces 43a of the inner wall portions 43 are faced toward the lens holder 50, and the outer surfaces 43b are faced toward the winding 48. In the illustrated preferred embodiment, the inner surfaces 43a and outer surfaces 43b of the inner wall portions 43 all are flat surfaces.

Figure 3:
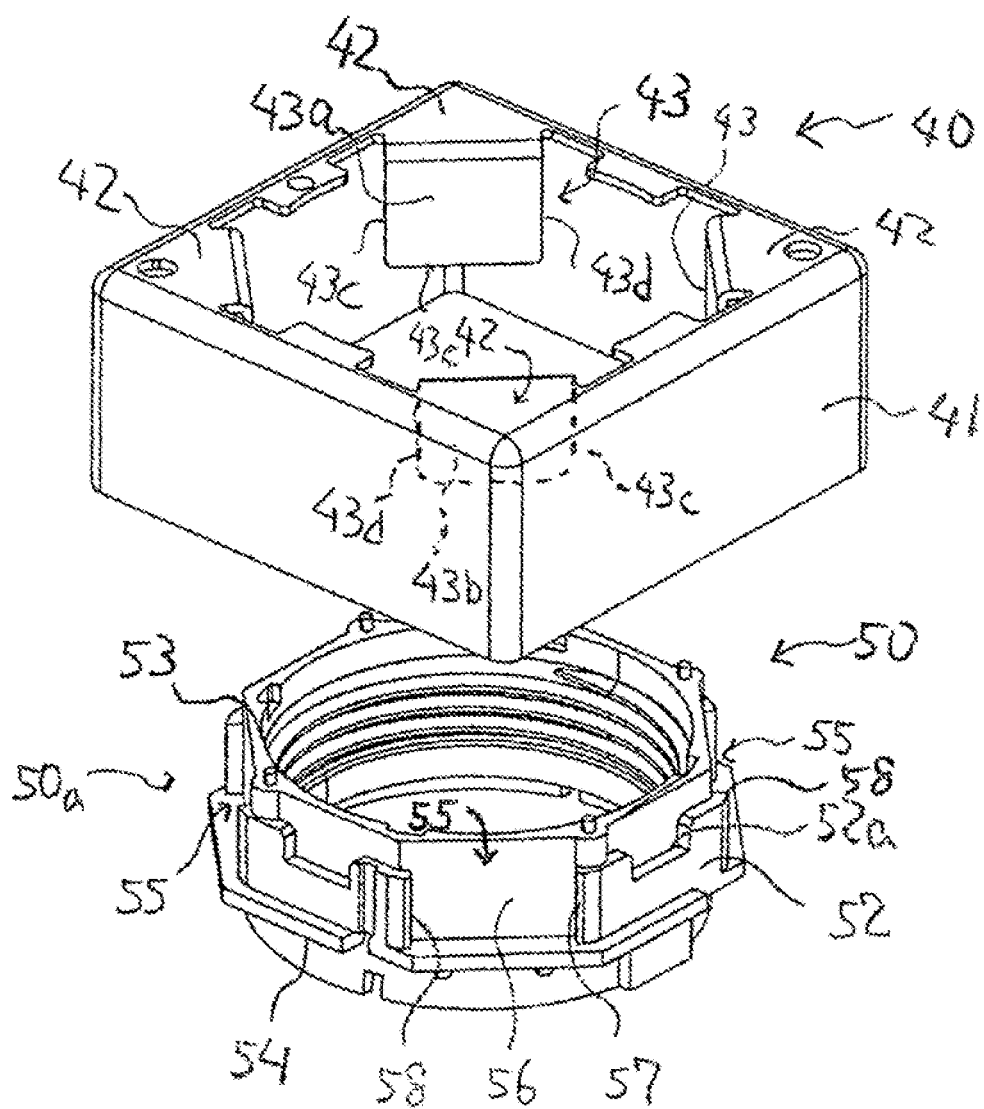
FIG. 3 is an exploded perspective view showing an outer case and a lens holder for the lens focusing device of the present invention in a disassembled state.
Figure 4:
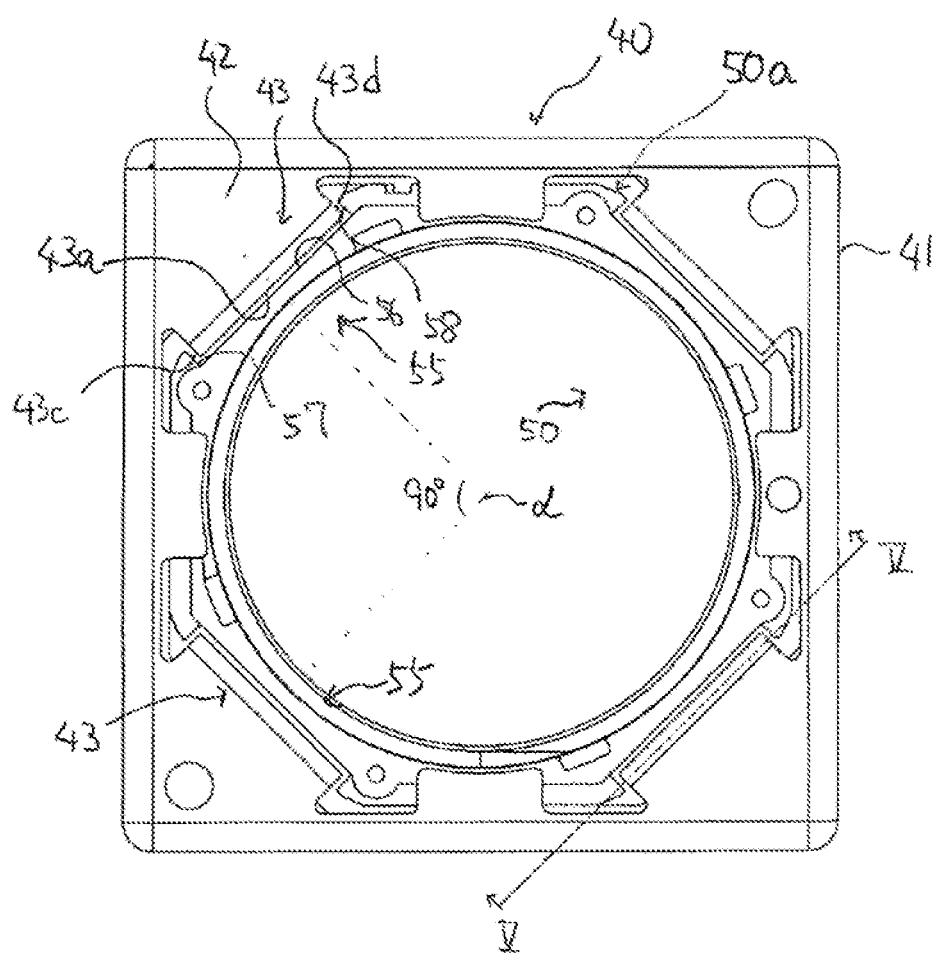
FIG. 4 is a top plan view showing the outer case and the lens holder of FIG. 3 in an assembled state.

FIG. 4 is a top plan view showing the outer case 40 and the lens holder 50 of FIG. 3 in an assembled state. Please refer to FIGS. 3 and 4 at the same time. The outer face 50a of the lens holder 50 is provided at locations corresponding to the inner wall portions 43 of the outer case 40 with a confining area 55 each. In the illustrated preferred embodiment, each of the confining areas 55 includes a main surface 56 and a first and a second raised side surface 57, 58 located at and raised from two lateral edges of the main surface 56. The inner surfaces 43a of the inner wall portions 43 of the outer case 40 are correspondingly faced against the main surfaces 56 of the confining areas 55 formed on the outer face 50a of the lens holder 50 with the first side surfaces 43c correspondingly faced against the first raised side surfaces 57 and the second side surfaces 43d correspondingly faced against the second raised side surfaces 58.

As can be clearly seen from FIG. 4, each of the first raised side surfaces 57 of the confining areas 55 is formed on one lateral edge of the main surface 56 to protrude in a direction away from the central light axis α, and is correspondingly faced against the first side surface 43c of the inner wall portion 43; and each of the second raised side surfaces 58 of the confining areas 55 is formed on an opposite lateral edge of the main surface 56 to protrude in a direction away from the central light axis α, and is correspondingly faced against the second side surface 43d of the inner wall portion 43.

Please refer to FIG. 3 again. The confining areas 55 and the winding mounting portions 52 are alternately formed on the outer face 50a of the lens holder 50. The first and the second raised side surface 57, 58 of each confining area 55 on the lens holder 50 are correspondingly formed, the first raised side surface 57 is connected to a lateral side of one winding mounting portion 52 located adjacent thereto, and the second raised side surface 58 is connected to a lateral side of another winding mounting portion 52 located adjacent thereto.

The winding 48 has an inner face in contact with or located close to the winding mounting portions 52 on the outer face 50a of the lens holder 50. The winding mounting portions 52 are raised from the outer face 50a of the lens holder 50, and respectively have a notch 52a formed thereon. The winding 48 can be firmly attached to the lens holder 50 by bonding or connecting it to the notches 52a using an adhesive.

Figure 5:
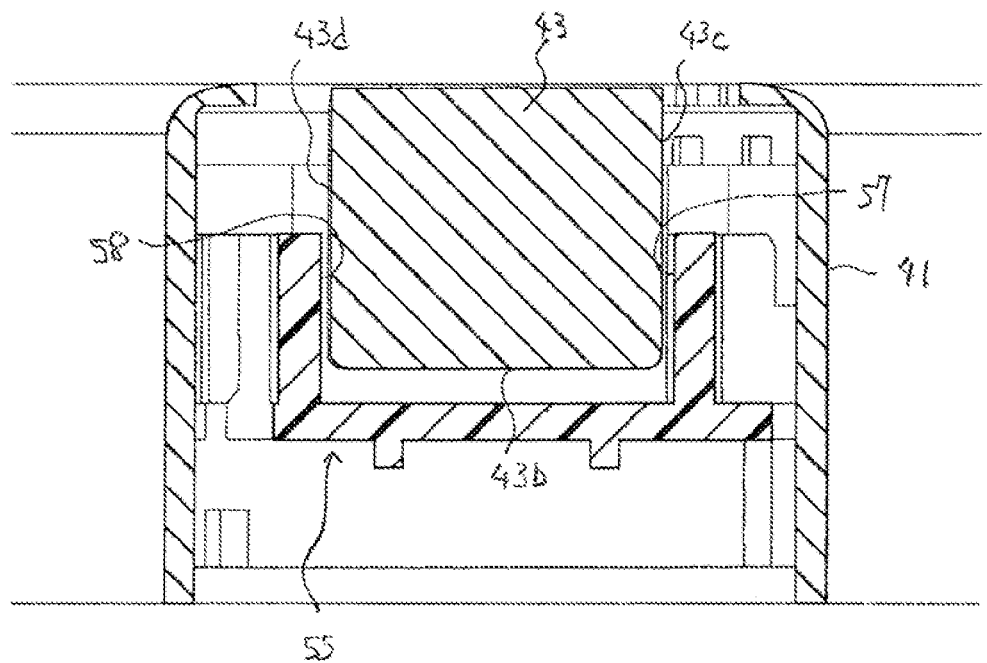
FIG. 5 is a sectional view taken along line V-V of FIG. 4.

FIG. 5 is a sectional view taken along line V-V of FIG. 4. Please refer to FIGS. 4 and 5 at the same time. The inner wall portions 43 of the outer case 40 and the confining areas 55 of the lens holder 50 are provided in pairs. In the case of encountering an external force impacting on the lens focusing device, the confining areas 55 of the lens holder 50 would become biased from the central light axis α to get into contact with the inner wall portions 43 of the outer case 40, so that the space within which the lens holder 50 can move is limited and the force impacting on the lens focusing device 10 is absorbed by the outer case 40. With these arrangements, the lens focusing device according to the present invention provides excellent impact resistance.

In the illustrated preferred embodiment, the moving of the inner surface 43a, the first side surface 43c or the second side surface 43d of each inner wall portion 43 of the outer case 40 relative to the lens holder 50 is respectively restricted by the main surface 56, the first raised side surface 57 or the second raised side surface 58 of a corresponding confining area 55 on the lens holder 50.

FIG. 6 is a sectional view taken along line VI-VI of FIG. 1. Please refer to FIGS. 4 and 6 at the same time. The main surface 56 of each confining area 55 is faced against the inner surface 43a of a corresponding inner wall portion 43 with a clearance "a" existed between the main surface 56 and the inner surface 43a. When the lens holder 50 is biased due to an external force impacted on the lens focusing device or when the lens holder 50 is subjected to parallel twisting due to the screwing of a lens thereinto, the main surface 56 of the confining area 55 would get into contact with the inner surface 43a to thereby limit an extent by which the lens holder 50 is biased or twisted. Therefore, any collision-caused impact or any undue twisting force can be absorbed by the lens focusing device.

Further, since the inner surfaces 43a of the inner wall portions 43 are flat surfaces, it is able to precisely control the clearances between the inner wall portions 43 and the lens holder 50 and between the inner wall portions 43 and the winding 48 to thereby enhance the driving performance of the voice coil motor. As shown in FIG. 6, the clearance "a" between the inner surfaces 43 of the inner wall portions 43 and the main surface 56 of the lens holder 50 is smaller than a clearance "b" between the outer surfaces 43b of the inner wall portions 43 and the winding 48. By reducing the clearance "a", miniaturization of the lens focusing device 10 can be advantageously achieved.

In the preferred embodiment shown in FIG. 4, the outer case 40 has four connecting portions 42 and four inner wall portions 43, which are arranged in the outer case 40 at four positions around the central light axis α to space from one another by 90 degrees and are connected to the outer wall portions 41 of the outer case 40. Meanwhile, the four confining areas 55 of the lens holder 50 are equally spaced on the outer face 50a of the lens holder 50 around the light axis α in one-to-one correspondence with the four inner wall portions 43. Therefore, the movement of the lens holder 50 is evenly limited in a balanced manner to absorb the colliding force produced by the contacting of the confining areas 55 with the inner wall portions 43.

As shown in FIG. 5, the first raised side surfaces 57 of the confining areas 55 are faced against the first side surfaces 43c of the inner wall portions 43 with a small clearance left between them, and the second raised side surfaces 58 of the confining areas 55 are faced against the second side surfaces 43d of the inner wall portions 43 also with a small clearance left between them. When the lens holder 50 is turned about the central light axis α under an external force, such as when a lens is screwed into the lens holder 50, the first raised side surfaces 57 or the second raised side surfaces 58 would get into contact with the first side surfaces 43c or the second side surfaces 43d, respectively, of the inner wall portions 43 and accordingly limit the lens holder 50 from turning any further. Similarly, the first and the second raised side surfaces 57, 58 can also correspondingly limit the moving extent of the first and the second side surfaces 43c, 43d, respectively, of the inner wall portions 43 relative to the lens holder 50. With these arrangements, the lens focusing device can effectively endure an impact of an external force on it to protect the lens holder 50 against deformation.

The lens focusing device 10 can also be used as an optical device with focusing and shake-correction functions. Further, the detailed shapes of the outer case 40 and the lens holder 50 can also be modified in accordance with the shapes of other components of the lens focusing device 10.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A lens focusing device, comprising:
a lens holder for holding a lens therein to move along a direction of a light axis and having an outer face, on which at least one confining area is formed;
a winding being fitted around the outer face of the lens holder;
an outer case enclosing the lens holder therein, and including an outer wall portion, at least one connecting portion, and at least one inner wall portion; wherein the connecting portion is connected to between the outer wall portion and the inner wall portion, and the inner wall portion is located between the lens holder and the winding; wherein the inner wall portion and the connecting portion are arranged at the corner of the outer wall portion; and
at least four magnets,
wherein the inner wall portion each includes an inner surface, an outer surface, and a first and a second side surface connected to between the inner and the outer surface; and the inner surface being faced against the lens holder while the outer surface is faced against the winding; wherein each of the magnets is arranged in a corner space defined by the inner surface of the inner wall portion and the outer wall portion;
wherein the confining area each includes:
a main surface of the lens holder faced against the inner surface of the inner wall portion of the outer case, wherein the main surface and the inner surface are flat; wherein the outer surface is faced against a flat surface of a magnet such that the inner wall portion is sandwiched between the main surface and the magnet;
a first raised side surface located at one lateral edge of the main surface to face against the first side surface of the inner wall portion; and
a second raised surface located at another lateral edge of the main surface to face against the second side surface of the inner wall portion; and wherein the at least one inner wall portion of the outer case is located corresponding to the at least one confining area on the outer face of the lens holder, and a clearance is existed between the first raised side surface and the second raised surface, and the inner wall portion into the clearance for limiting a space within which the lens holder can move left or right rotation and protecting the lens holder against biasing or undue twisting under impact of an external force thereon;

wherein a first clearance between the inner surface of the inner wall portion and the main surface of the lens holder is smaller than a second clearance between the outer surface of the inner wall portion and the winding.

2. The lens focusing device as claimed in claim 1, wherein the lens holder further includes at least one winding mounting portion raised from the outer face of the lens holder; and each confining area being located between two adjacent winding mounting portions.

3. The lens focusing device as claimed in claim 1, wherein the inner surface and the outer surface of the inner wall portion as well as the main surface of the confining area all are flat surfaces.

4. The lens focusing device as claimed in claim 1, wherein the first and the second raised side surface are extended in a direction substantially parallel with the direction of the light axis and are generally parallelly spaced from each other.

5. The lens focusing device as claimed in claim 1, wherein the connecting portion has an inverted U shaped cross section with the outer surface of the inner wall portion and the outer wall portion opposite to each other.

6. The lens focusing device as claimed in claim 5, wherein the magnet is placed between the winding and the outer wall portion.

\* \* \* \* \*